United States Patent
Dittmar

(10) Patent No.: US 6,832,536 B2
(45) Date of Patent: Dec. 21, 2004

(54) MACHINE AND METHOD FOR SERVERING A THIN-WALLED TUBE

(75) Inventor: Edbert E. L. Dittmar, Provo, UT (US)

(73) Assignee: Exotic Metal Forming Company, Kent, WA (US)

(*) Notice: Subject to any disclaimer, the term of this patent is extended or adjusted under 35 U.S.C. 154(b) by 16 days.

(21) Appl. No.: 10/152,455

(22) Filed: May 21, 2002

(65) Prior Publication Data

US 2003/0217624 A1 Nov. 27, 2003

(51) Int. Cl.[7] .................... B23D 21/00; B23B 5/14
(52) U.S. Cl. ..................... 83/184; 83/180; 82/59; 82/101; 225/96.5
(58) Field of Search ............... 82/59, 60, 101, 82/100; 83/181, 182, 184, 180; 225/96.5

(56) References Cited

U.S. PATENT DOCUMENTS

| | | | |
|---|---|---|---|
| 3,993,231 A | 11/1976 | Monteiro | |
| 4,084,466 A | 4/1978 | Sipusic | |
| 4,227,431 A | 10/1980 | Wells | |
| 4,291,453 A | 9/1981 | Mathieu | |
| 4,302,958 A | 12/1981 | Andriessen | |
| 4,649,780 A | 3/1987 | Takeuchi | |
| 4,748,881 A | 6/1988 | Keeling | |
| 4,779,496 A | 10/1988 | Evans | |
| 4,794,834 A | 1/1989 | Werner | |
| 4,930,379 A | * 6/1990 | Takaniemi | 82/101 |
| 5,014,579 A | 5/1991 | Galonska | |
| 5,383,380 A | 1/1995 | Sartori | |
| 5,457,877 A | 10/1995 | McDermott | |
| 6,101,910 A | 8/2000 | Nicolai | |

* cited by examiner

Primary Examiner—Charles Goodman
(74) Attorney, Agent, or Firm—David L. Tingey

(57) ABSTRACT

A tube cutting machine comprises a tube secured in a chuck tightened against an outer tube wall and by a mandrel expanded within the tube against the tube inner wall opposite the chuck. A blade with a conical body side on the tube body side advances into the tube at the body side angle, eliminating longitudinal force against the tube body and accumulation of tube material on the blade body side. In alternative embodiments, either the tube or the blade can rotate. As the blade edge enters the tube wall, the blade end side, opposite the body side is also conical and pushes the tube cut portion longitudinally away from the tube body, causing the tube before the blade to neck under the longitudinal force imposed by the blade end side. The blade is reversed when the neck weakens and is unable support the tube cut portion but has not yet broken, referred to as the failure point. The blade is then withdrawn and the neck is snapped off. The failure point is detected by a rod urged transversely against the tube end. When the tube end begins to move indicating pending tube wall failure, the blade is immediately withdrawn from the tube. The rod continues to move the tube cut portion, snapping it from the tube body. The resulting cut does not have any burrs radially inward or outward of the tube wall, though there is a small burr extending longitudinally from the tube wall.

22 Claims, 15 Drawing Sheets

MACHINE AND METHOD FOR SERVERING A THIN-WALLED TUBE

BACKGROUND

1. Field of the Invention

This invention relates to tube cutting machines, and specifically to machines for cutting thin-walled metal tubes without burrs protruding radially from the tube end.

2. Prior Art

It is well-known in the art to have tube cutters, including small hand cutters revolving around a small metal tube as a user tightens a rolling blade into the tube side wall and also including large tube shearing machines, also typically having a rolling blade orbiting around a large stationary tube but including a mandrel within the tube to prevent tube deformation.

Whether the blade rotates around the tube or the blade moves radially into a rotating tube, the cutting action is similar. A rotating blade moves into the tube wall until the blade severs the tube end from the tube body leaving extensive burrs protruding radially inward and outward of the tube wall. This is inherent in the cutting process employed. With the blade moving radially into the tube, tube wall metal is pushed longitudinally with the tube wall to make room for the blade and then necessarily radially outward and inward—the only place for the metal to go as it can't move successfully against the remaining tube wall or the blade. The blade continues into the tube wall until it completely penetrates the wall and thus severs the tube end from the tube body, continuing to create displaced metal radial of the tube wall. The displaced metal remains as burrs after the tube end is severed.

This conventional tube-cutting process inevitably requires further processing such as grinding to remove the burrs prior to further application, such as welding or otherwise joining to other assembly members or simply cleaning to avoid inadvertent skin cuts from the burrs. Further processing is generally time consuming and expensive.

It is a primary object of the present invention to provide a method to cut thin-walled tubes without leaving radial burrs, thus obviating the need for further processing to eliminate those burrs.

SUMMARY

This primary object is achieved in a method that creates a neck in the tube wall before a cutting blade moving into the tube wall, drawing tube material away from the tube inner wall diameter creating an inner groove as the blade creates an outer groove, the neck forming between the grooves. Necking follows stretching of the tube end from the tube body before the cutting blade, a well-known effect resulting from stretching a material. The cutting blade initially defines a weakened point on the tube wall and then a stretching longitudinal force on the tube further weakens the wall at that point in the necking process.

The longitudinally stretching force can be applied explicitly with an attachment to the tube distal end urging the end away from the tube body as the blade penetrates the tube wall. The force can also be obtained from the blade itself. The blade comprises a body side and an end side joining at a blade edge, each at angles from normal to the tube wall, referred to as body side angle and end side angle. For these purposes, the blade body side refers to the blade side closest to the tube body and the blade end side refers to the blade side closest to the tube cut portion. The portion of the tube being severed away from the larger remaining tube is referred to as the tube cut portion, or distal end; the remaining tube portion is referred to as the tube body, or proximal end. As the blade edge enters the tube wall, the blade end side pushes the tube cut portion longitudinally away from the tube body, causing the necking result. To prevent material from being urged radially outward on the tube body, rather than advancing the blade perpendicular, or normal, to the tube, the blade is advanced into the tube at the body side angle. Thus, there is neither material accumulating on the body side because of the angle of penetration nor on the cut side because the tube is urged longitudinally away from the blade providing room for the blade.

As the blade continues into the tube wall the inner channel becomes greater and the neck becomes increasingly thin until the tube wall fails, not because the blade has penetrated to the tube inner wall but because the neck has thinned and weakened until it no longer can support the tube cut portion, or that portion removed from the tube body. When the tube cut portion thus separates from the tube wall at the broken neck, only the remnants of the neck remain—a minor ridge on the severed ends between their inner and outer walls extending longitudinally.

A tube cut with the new method thus does not have any burrs radially inward or outward of the tube wall, though there is a small burr extending longitudinally from the tube wall.

If the blade continued into the tube after the neck had broken, the blade could bend the remaining neck ridge inward and cause a radially inward burr, defeating the purpose and achievement of the method. It is therefore important to stop the blade from advancing no later than when the neck fails. In practice, the blade is reversed when the neck weakens and is unable support the tube cut portion but has not yet broken, referred to as the failure point. The blade is then withdrawn and the neck is snapped off.

The failure point is detected by a rod urged transversely against the tube cut portion with a rod bias. The rod bias is small such that it cannot move the tube until the failure point is reached. When the rod begins to move the tube cut portion under the rod bias, the blade is immediately withdrawn. The rod continues to move the tube cut portion, snapping it from the tube body. Though the process of removing the blade and snapping the tube cut portion from the tube body is sequential, in effect and appearance it is simultaneous.

In a first embodiment, a tube is held in a chuck with an expanding mandrel. A mandrel shaft positions the chuck in the tube opposite the chuck with a mandrel distal end extending beyond the tube and just slightly beyond the blade. The chuck then rotates with the tube as the blade advances toward the tube, as in a common lathe. The blade and mandrel are mutually positioned so the mandrel extends only slightly beyond the blade edge as it approaches the mandrel through the tube so when the tube snaps off, the tube cut portion easily falls off the mandrel.

Clearly, it doesn't matter to the severing process whether the chuck rotates the tube and the blade is stationary relative to the tube (except the transverse advance of the blade toward the mandrel) or the chuck and tube are stationary and the blade rotates orbitally around the tube. Therefore, a second embodiment includes a stationary chuck for receiving a tube with the mandrel axially within the chuck and a blade on a tool mount rotating on a ring generally around the chuck and tube. Similarly, if applied to an installed tube, the chuck is not required and the mandrel is secured in the tube relative to the ring. The blade still advances transversely toward the mandrel, in this embodiment from the ring on which the tool mount rotates, controlled by a motor on the tool mount. This approach has the advantage of substantially requiring only the ring with tool to effect the process, which allows the cutting machine to be mobile. Thus, the machine can be taken to the tube, rather than the tube to the machine. This is applicable where the tube is already installed. It is also advantageous where the tube is bent or large or otherwise unsuitable to be rotated in a rotating chuck.

In instances where the tube is bent, a normally extended mandrel cannot move in the tube past tube bends. The compact mandrel is then employed having a reduced longitudinal dimension, sufficient short to move around tube bends.

In the simplest embodiment, the mandrel shaft is inflexible extending a length generally from the chuck to a shaft support sufficiently removed to receive a tube of length up to that distance over the shaft and mandrel. A hydraulic line (conduit) runs from a pneumatic pump and valve on the shaft support through the shaft to the mandrel, actuated by a pneumatic line between a user's control panel and the valve. In an alternative embodiment, the shaft is flexible and of arbitrary length, typically coiled on a spool and uncoiled as necessary to move the mandrel within the tube to its position opposite the chuck. The tube is then supported at the shaft support independent of the shaft. The hydraulic line continues to run within the shaft to the mandrel. A device to measure the position of the mandrel from the tube at the shaft support assures the mandrel is properly located opposite the chuck and the blade.

The mandrel is of selective size to match the tube being cut. Its outer diameter is slightly less than that of the tube inner diameter and slidable therein, expanding under hydraulic control to grasp the tube from within.

BRIEF DESCRIPTION OF THE DRAWINGS

FIG. 3 illustrates the blade edge very near the cavity, larger than in FIG. 2.

FIG. 4 shows the tube cut portion snapped off the tube body leaving only a small longitudinal burr between the tube inner and outer walls constituting the remnants of the failed neck.

DETAILED DESCRIPTION OF THE PREFERRED EMBODIMENT

Figure 1:
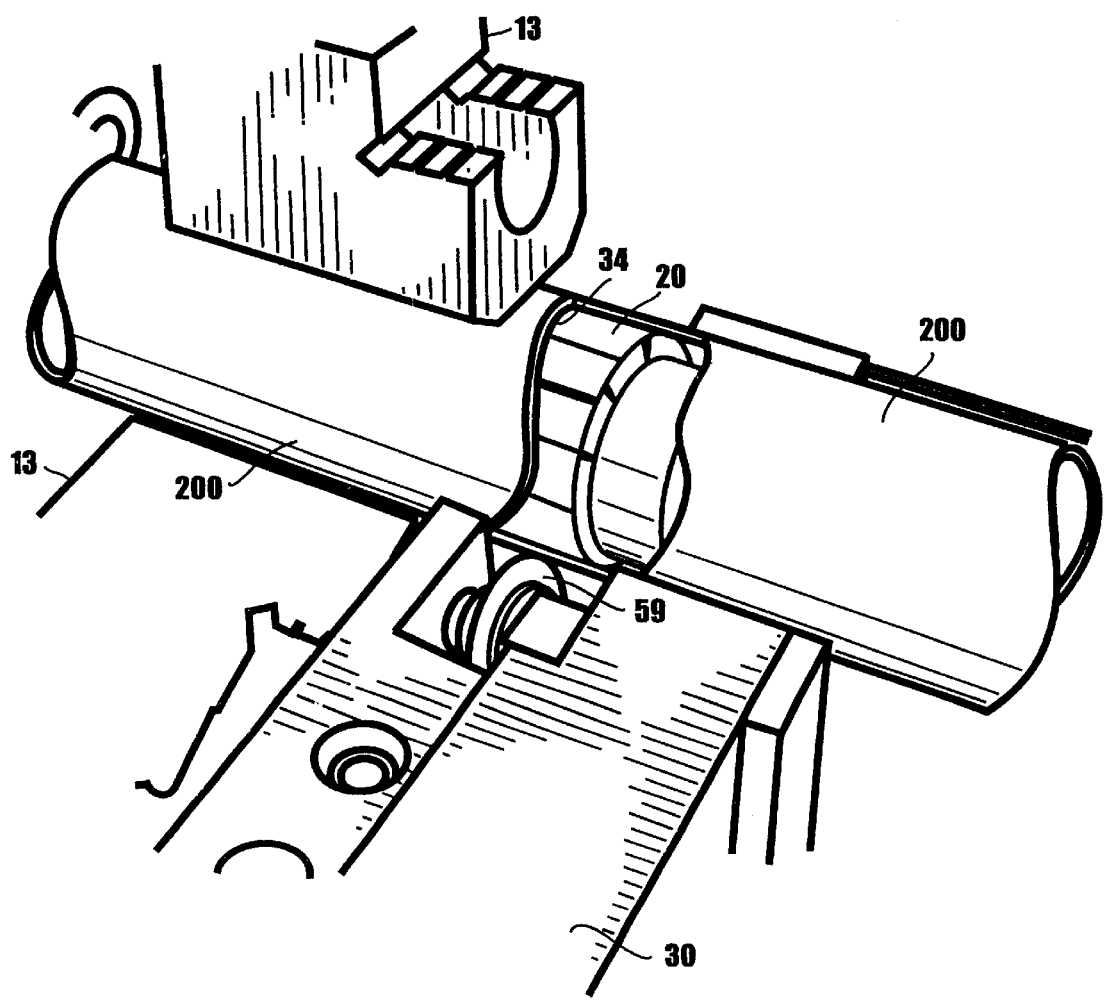
FIG. 1 is a cut-away side view of fundamental elements of primary embodiment of the present invention, showing the chuck and mandrel securing a tube before a blade on a tool holder, indicating the movement of the tool holder on a line parallel to the body side of the blade.
Figure 2:
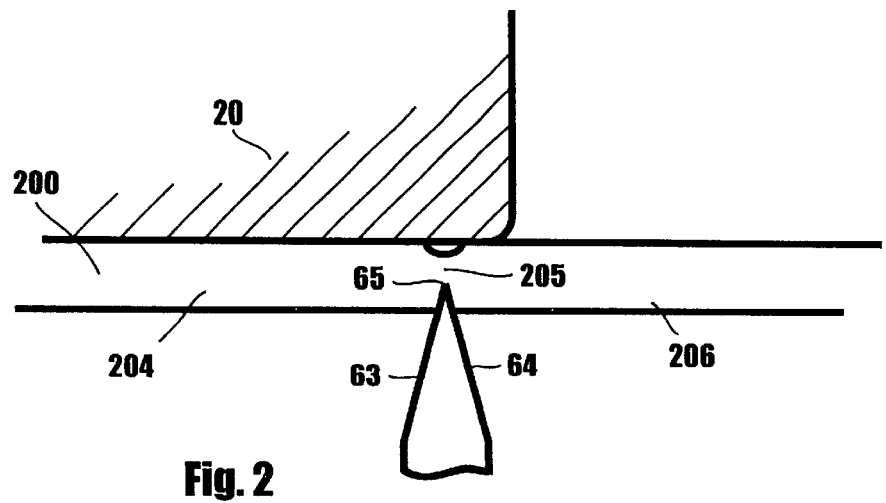
FIG. 2 through FIG. 4 illustrate progressive stages of a blade cutting through a tube, showing in FIG. 2 the beginning of a necking affect creating a cavity in the tube inner wall.
Figure 3:
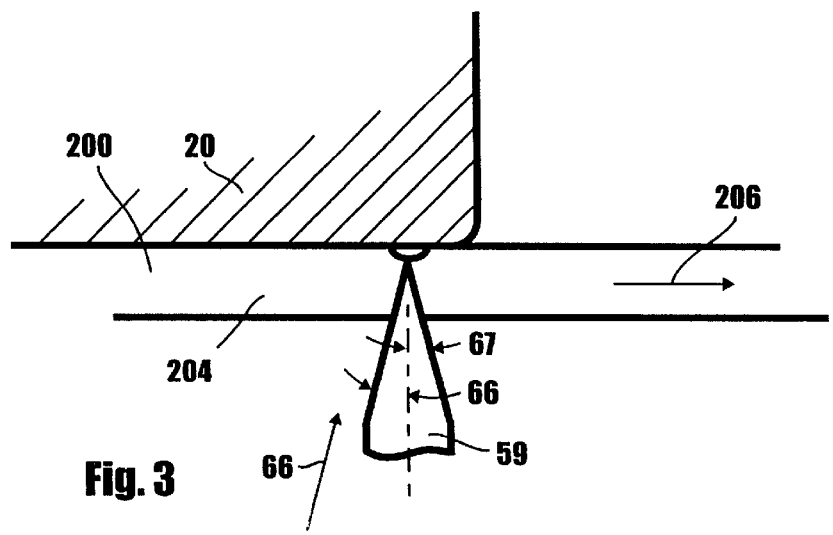
Figure 4:
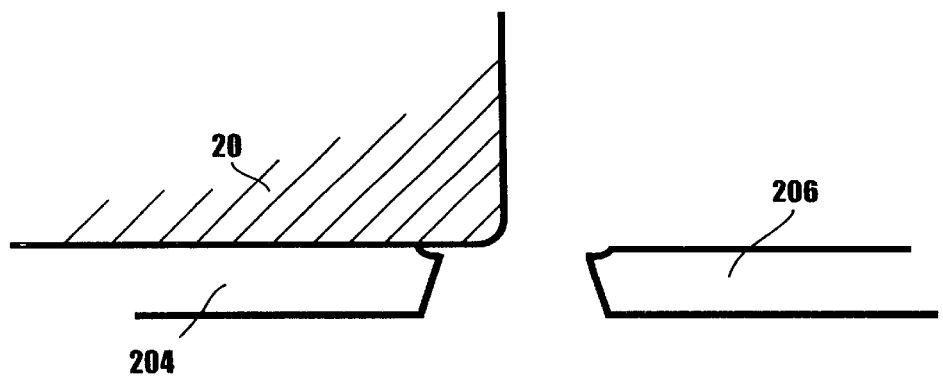
Figure 5:
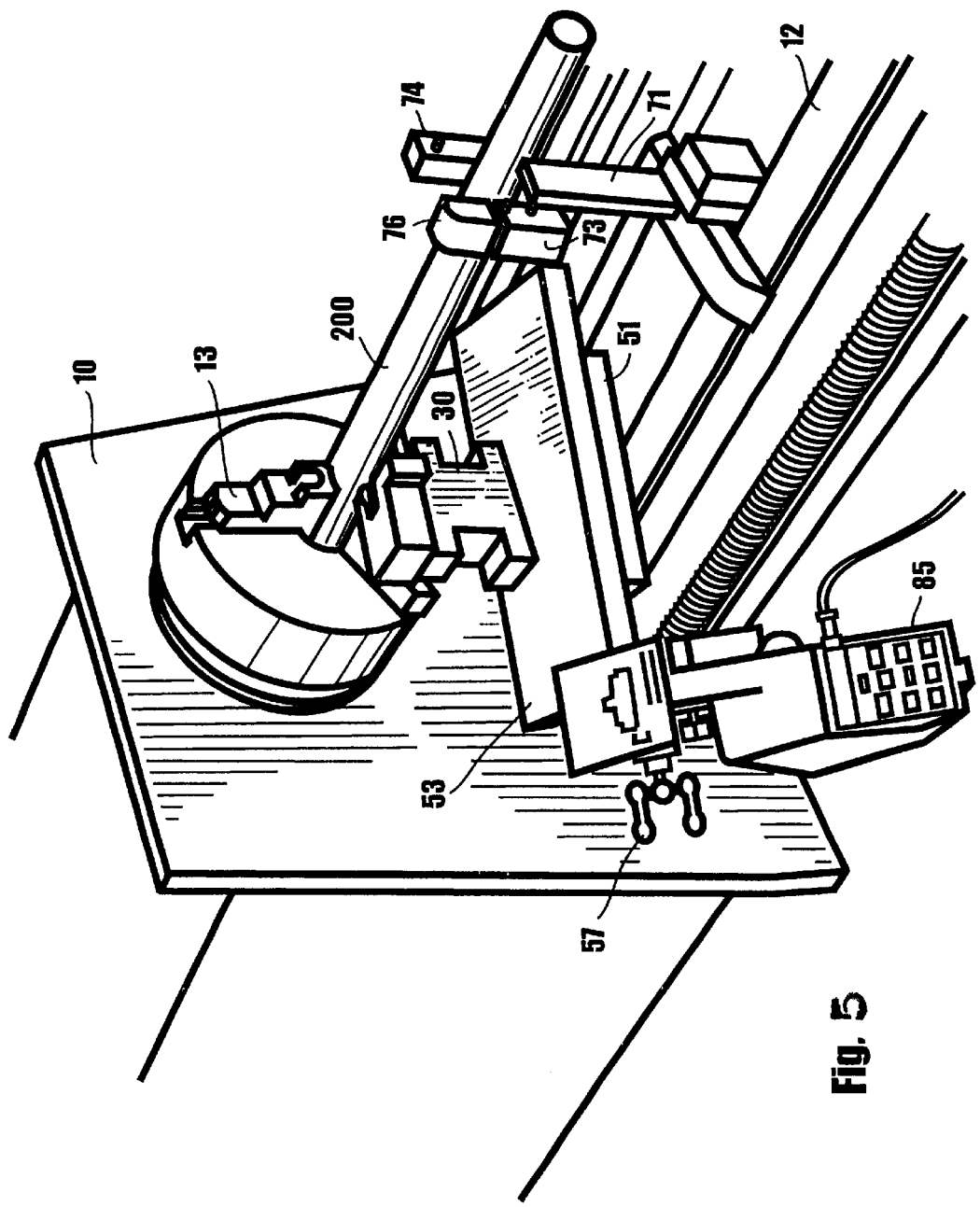
FIG. 5 (8) is a perspective view the invention, showing a mandrel positioned within a chuck before a tool holder.
Figure 6:
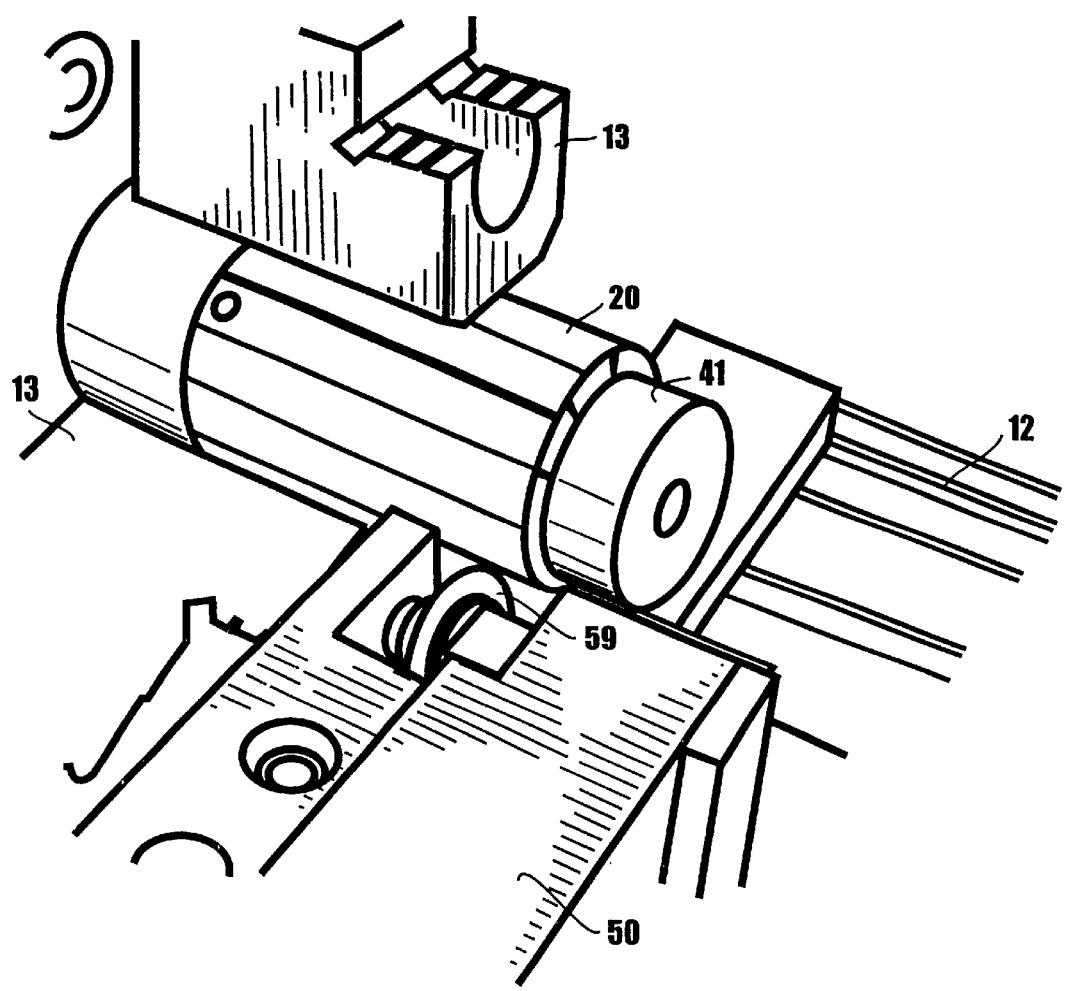
FIG. 6 (1) is a perspective view of the mandrel in its expanded position.
Figure 7:
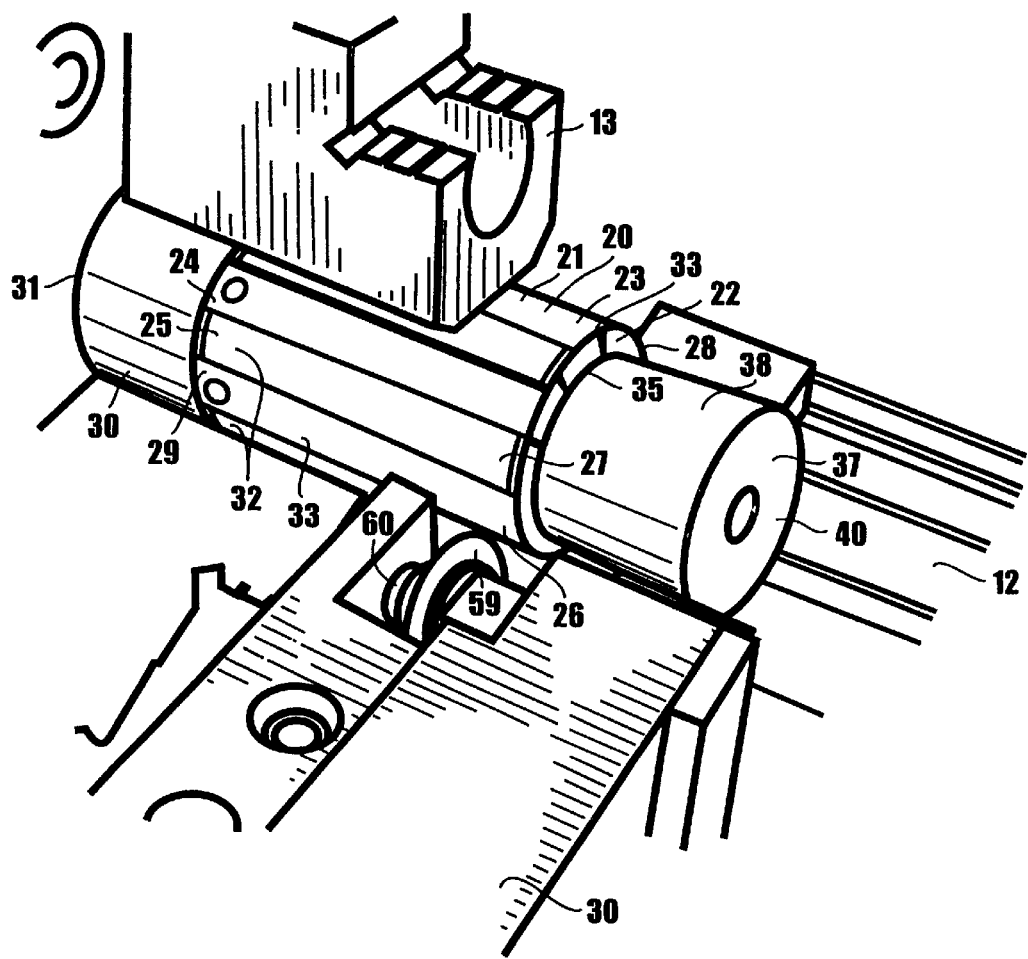
FIG. 7 (2) is a perspective view of the mandrel in its rest position
Figure 8:
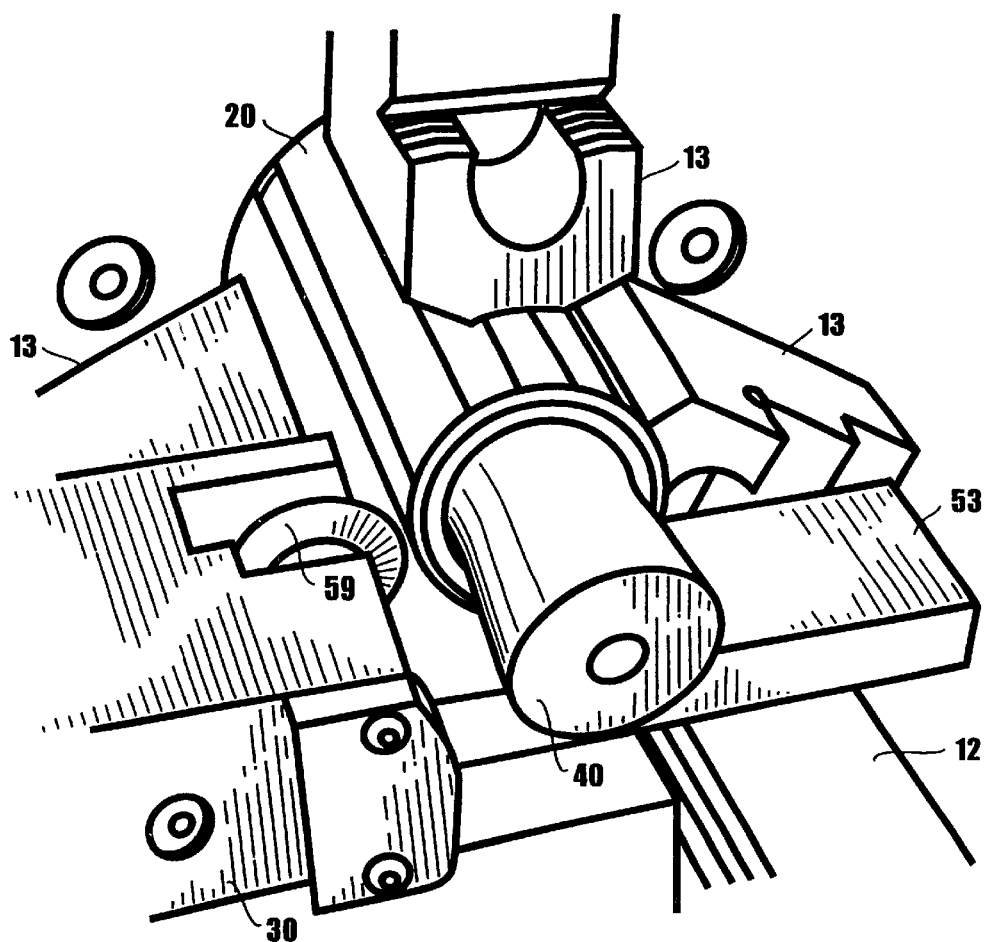
FIG. 8 (3) is a front perspective view of the chuck, mandrel in its rest position, and blade in the tool holder position near the end of the mandrel.
Figure 9:
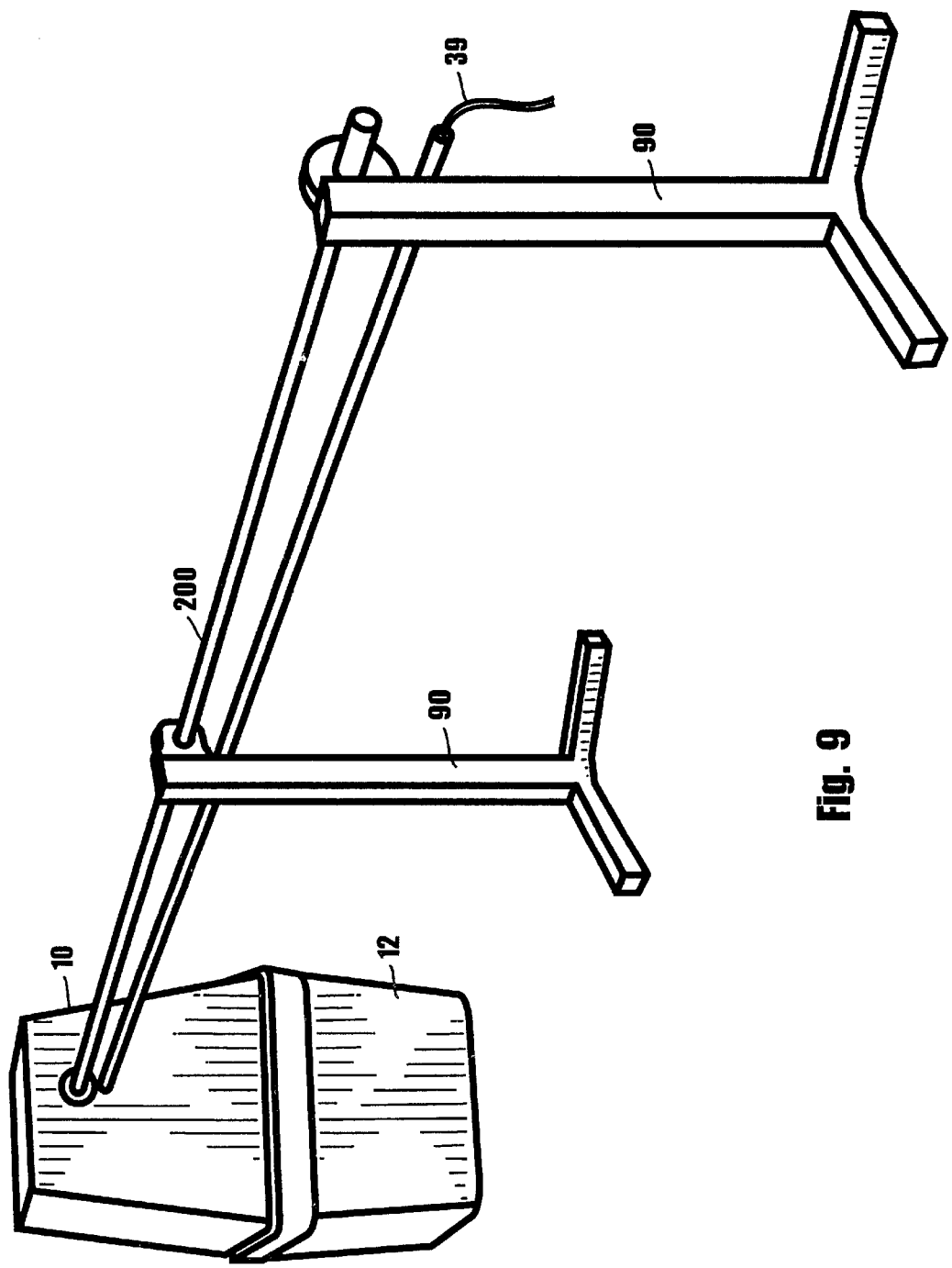
FIG. 9 (6) is a rear perspective view of the machine showing a mandrel shaft extending rearward of the lathe to a shaft support.
Figure 10:
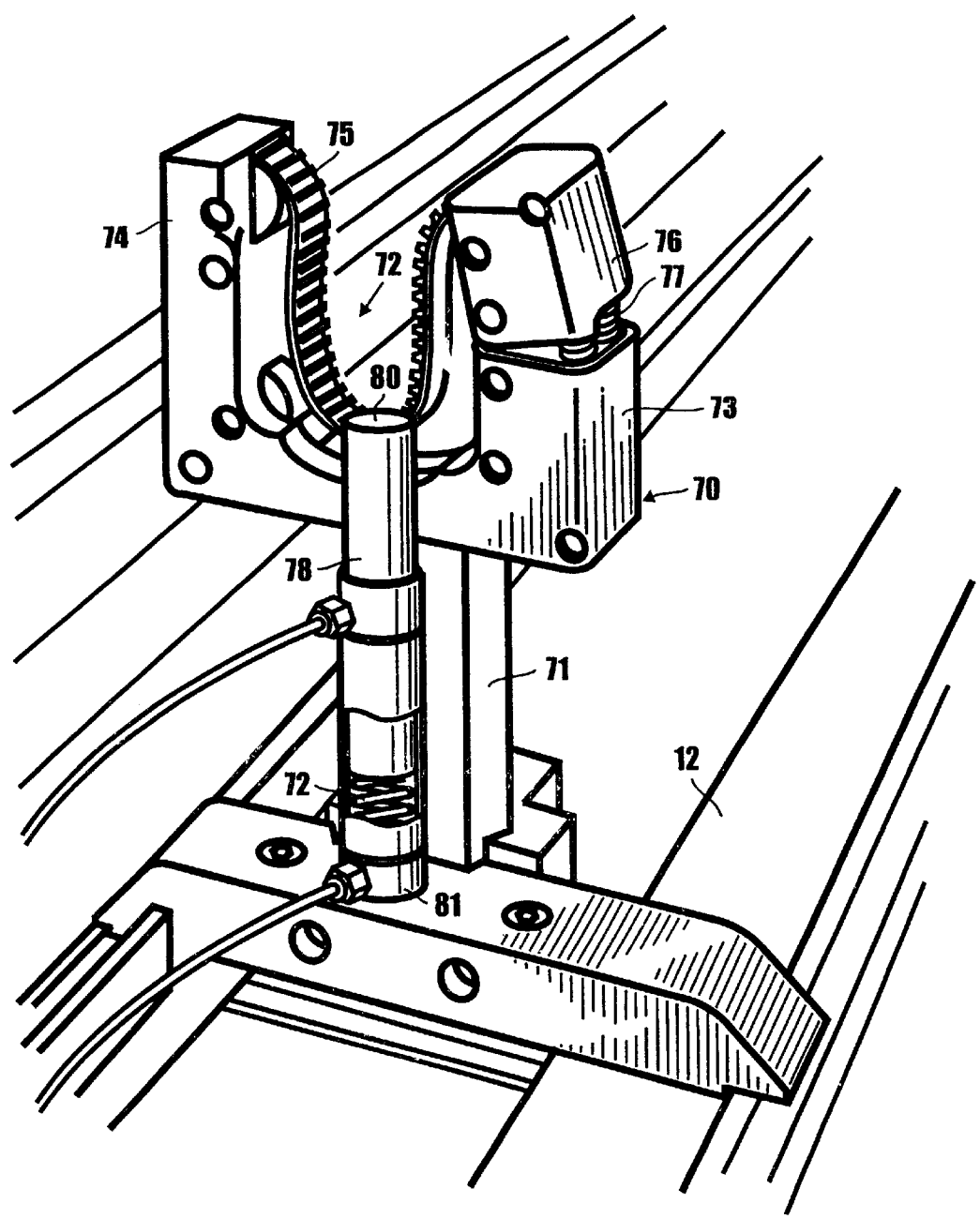
FIG. 10 (12) is a rear perspective view of the tube separator showing the bar, stand and sling with keeper.
Figure 11:
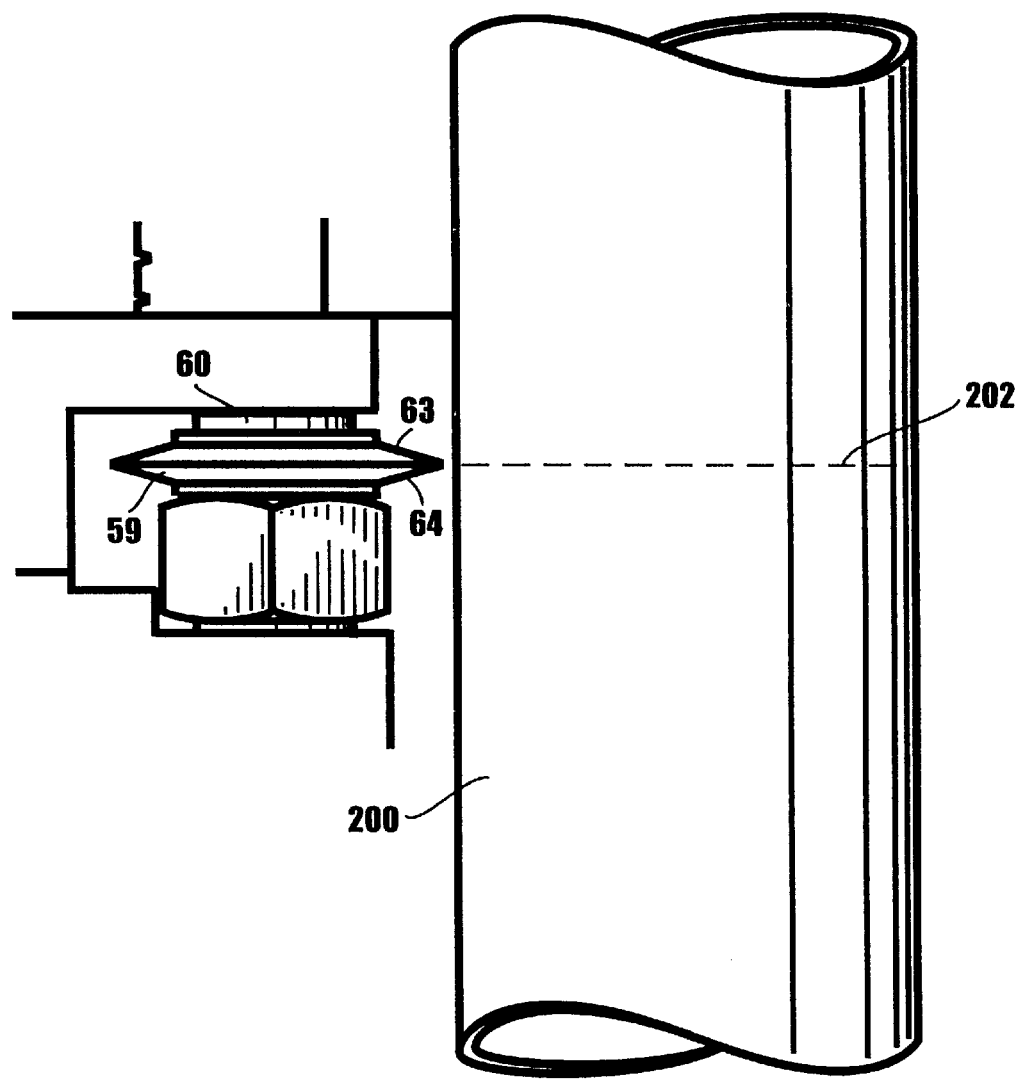
FIG. 11 (18) is a top view of the blade in the tool holder before a tube.
Figure 12:
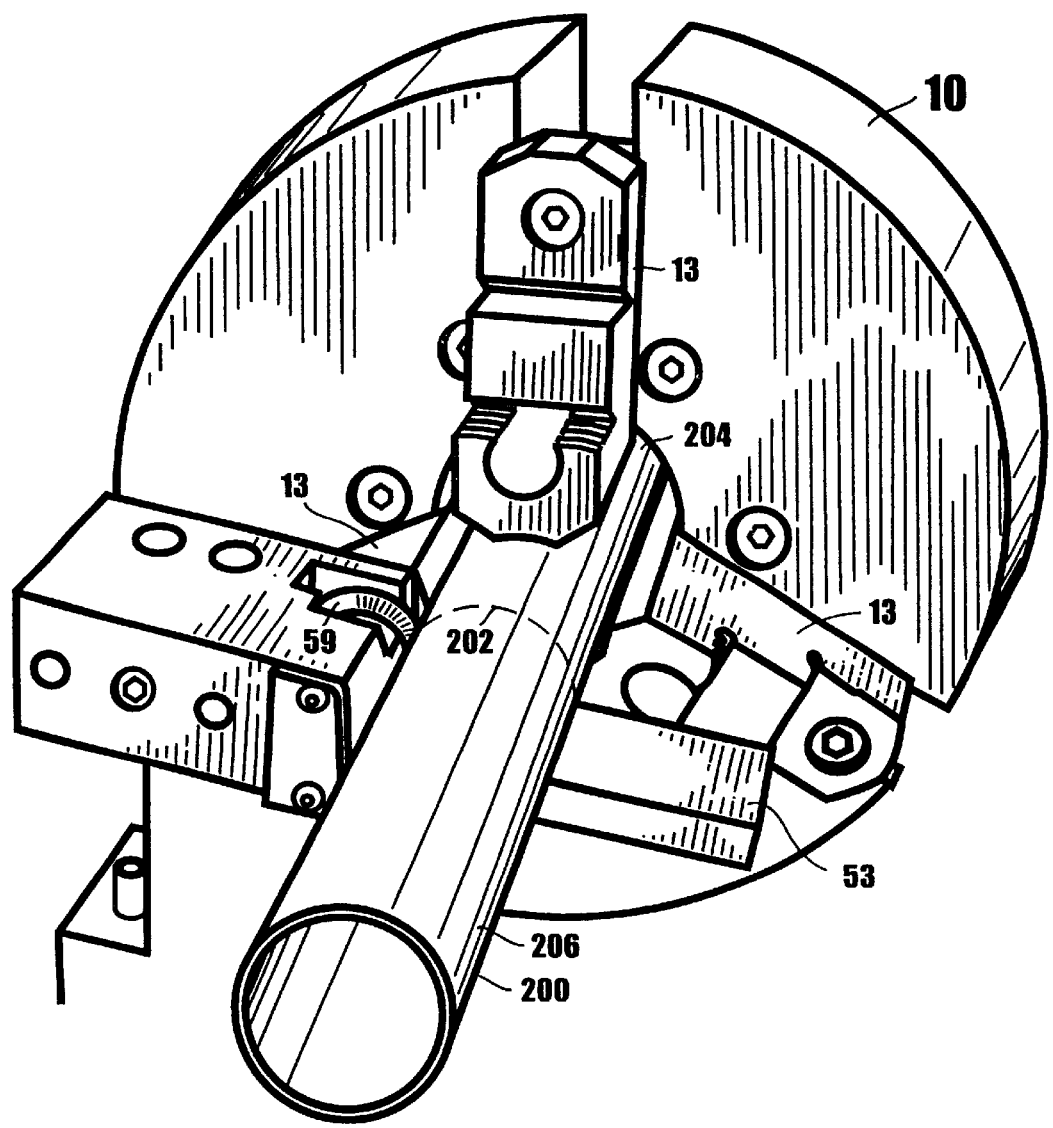
FIG. 12 (19) is a front perspective view of the tool holder with blade before a tube, shown also in FIG. 11.
Figure 13:
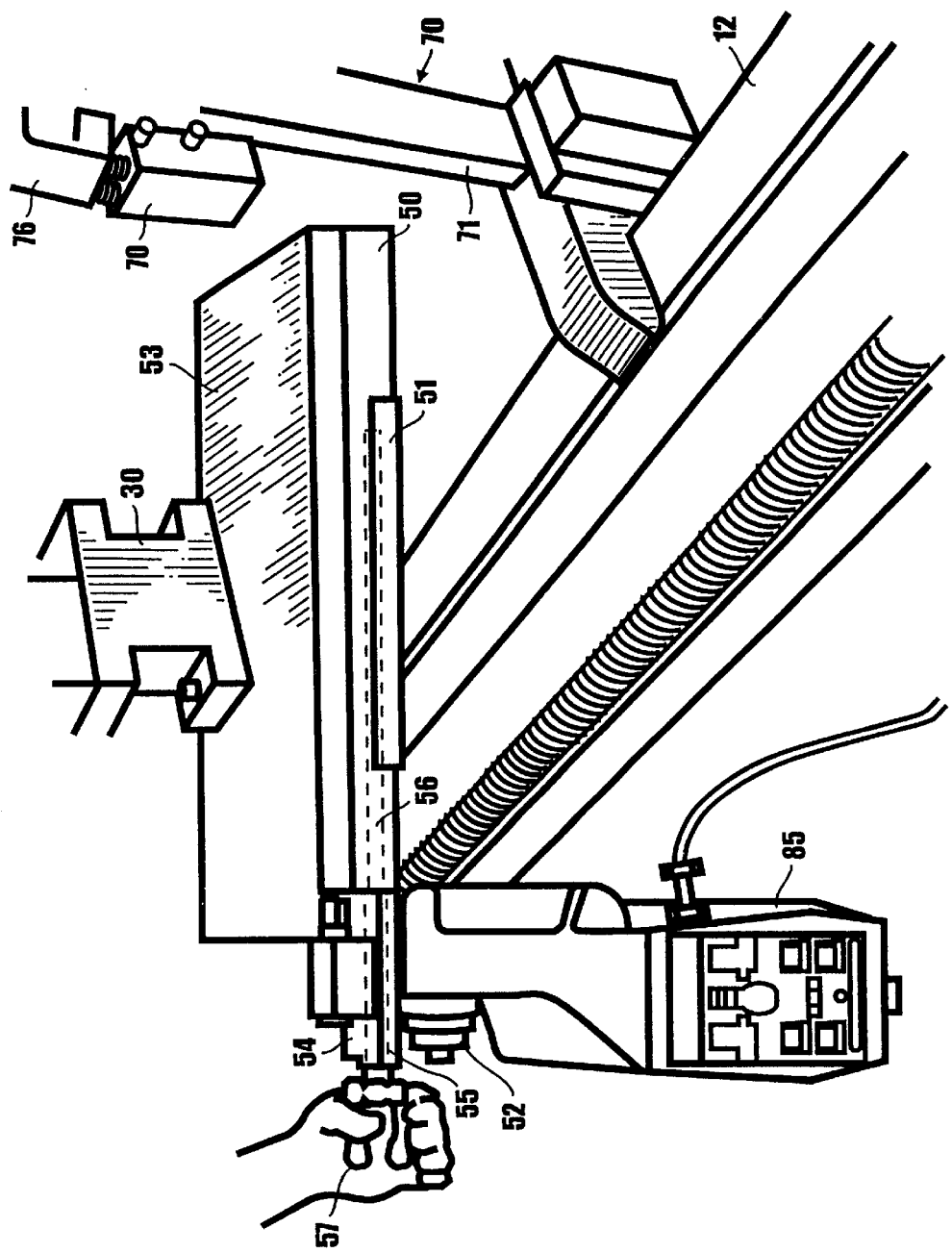
FIG. 13 (21) is a perspective view of a tool holder on a tool holder plate slidably mounted on tool holder platform, also showing a processor and manual control on the plate driven relative to the platform by motor engaging a threaded rod.
Figure 14:
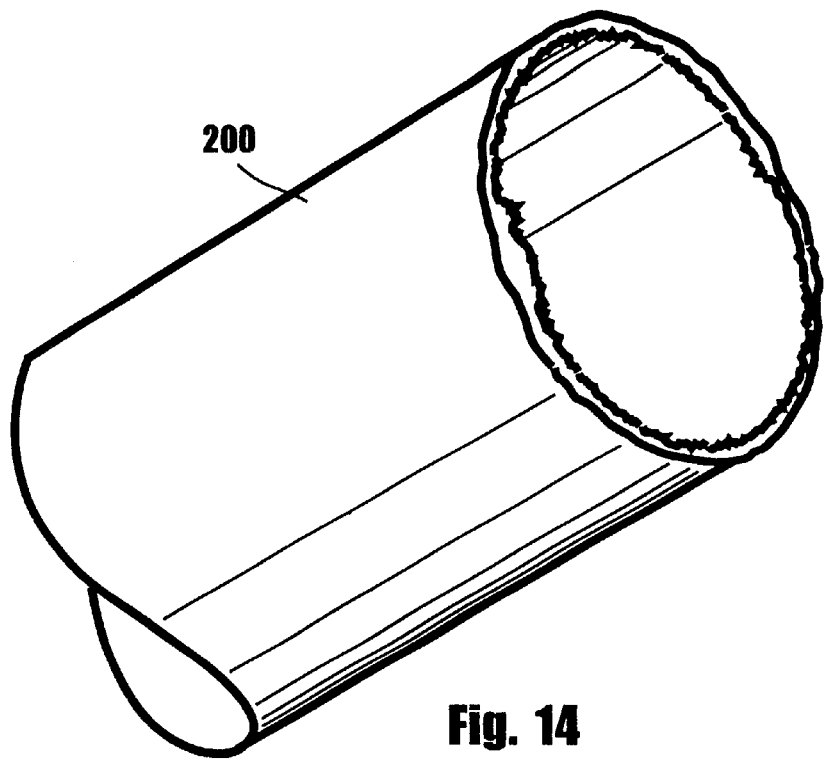
FIG. 14 (22) is an perspective end view of a tube cut using traditional methods, leaving undesirable burrs extending radially beyond the tube wall.
Figure 15:
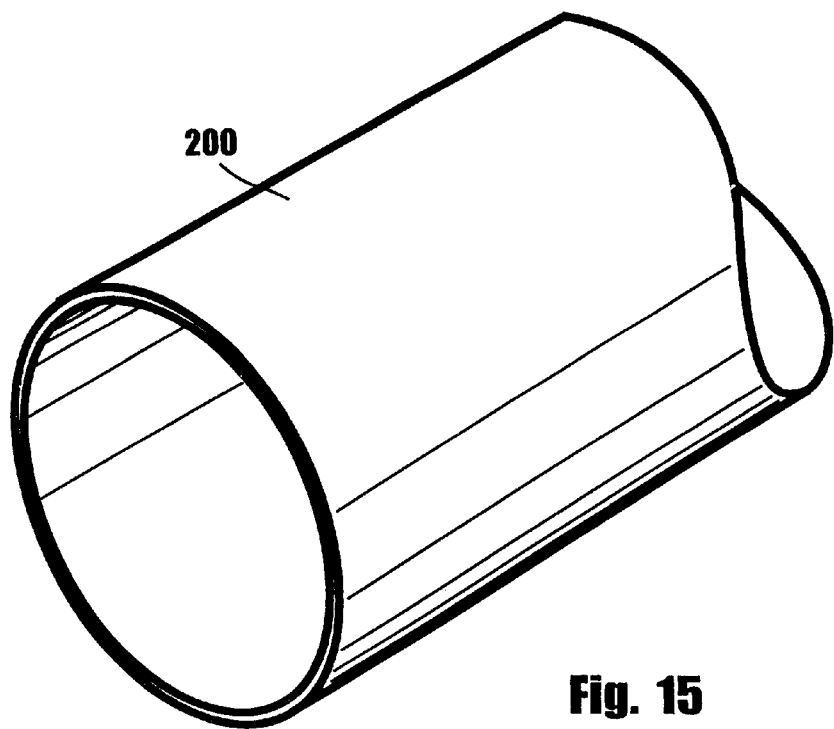
FIG. 15 (23) is an perspective end view of a tube cut using the present invention, leaving only small, unnoticeable burrs radially within the tube wall.
Figure 16:
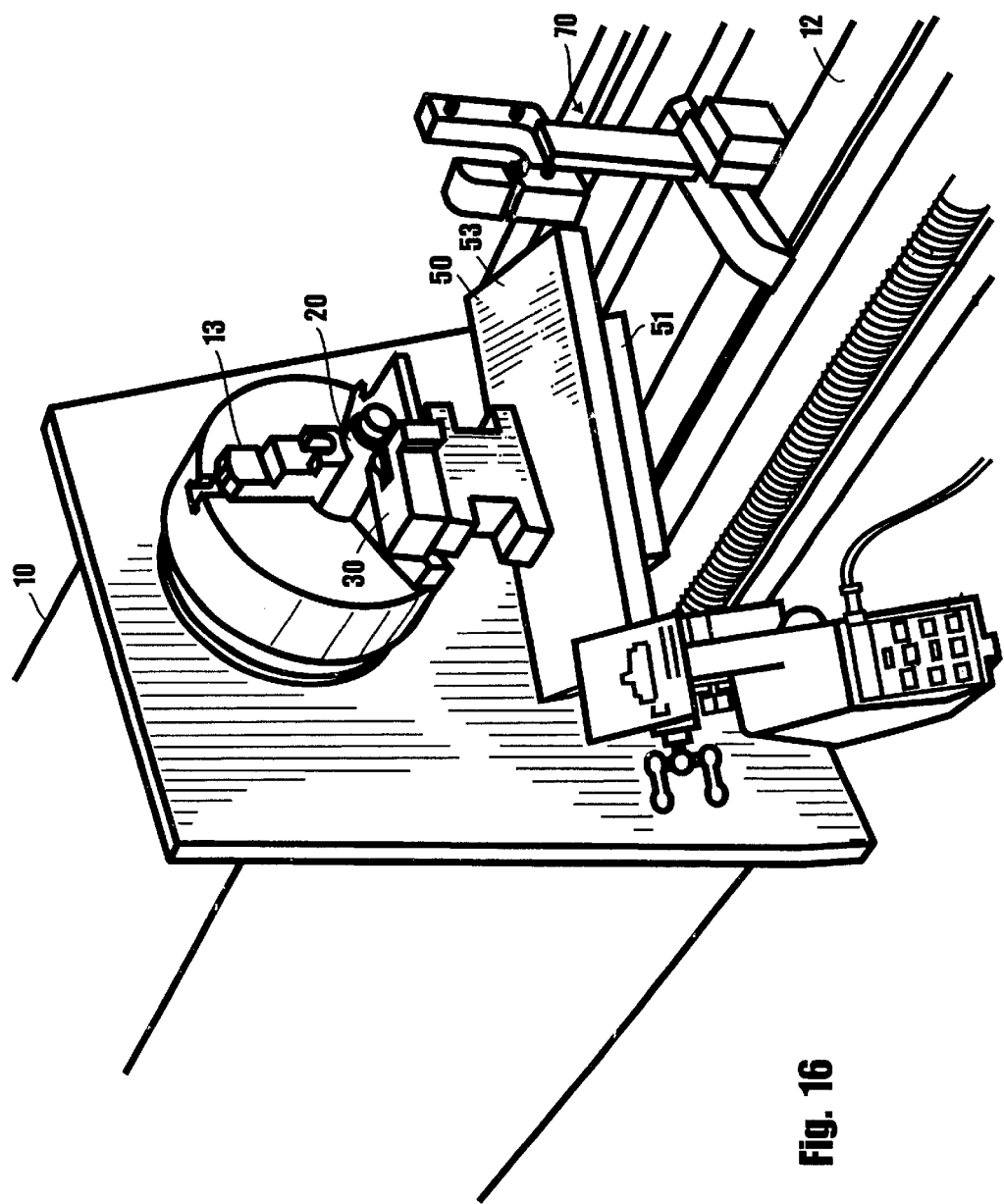
FIG. 16 (29) is a top perspective view shown the angle of the tool holder plate advancing into the mandrel.
Figure 17:
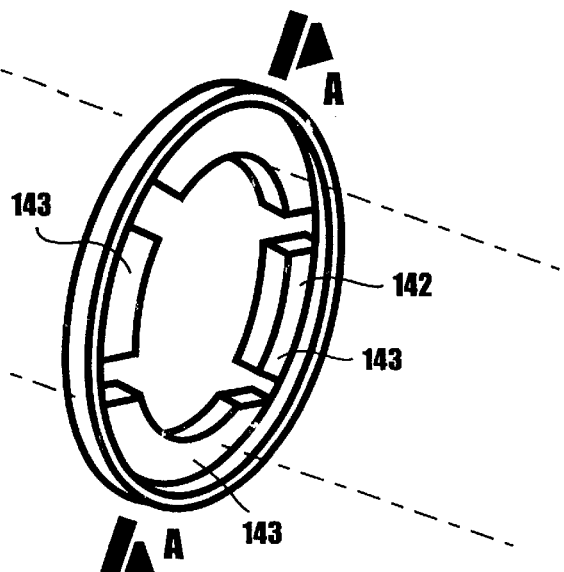
FIG. 17 is a perspective view of the ring of the alternate embodiment.
Figure 18:
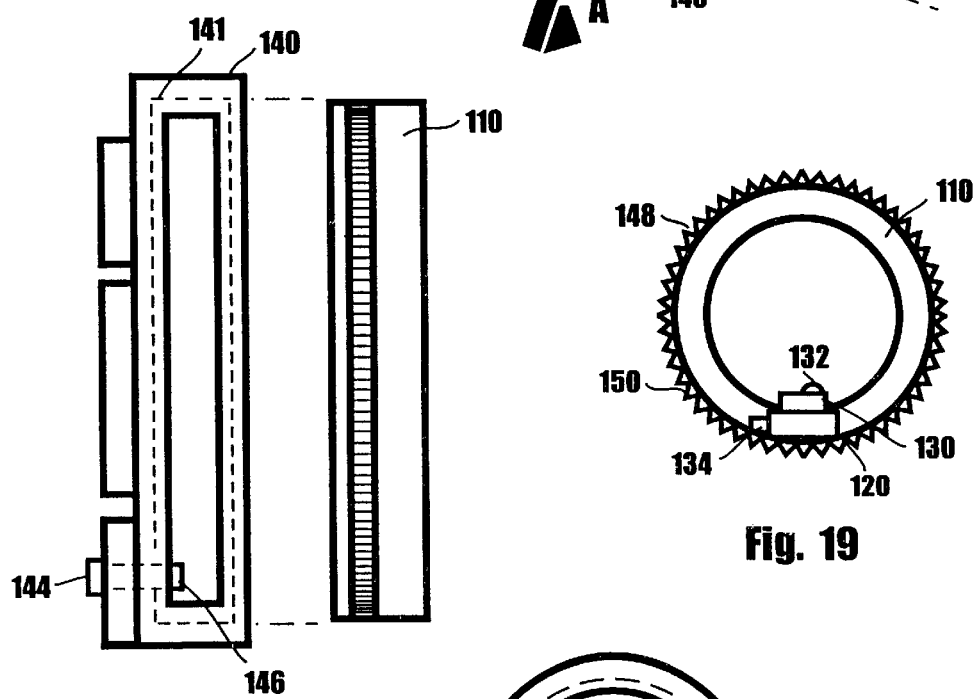
FIG. 18 is a cut-away end view of the ring of FIG. 17 showing an annular ring mount and a ring.
Figure 19:
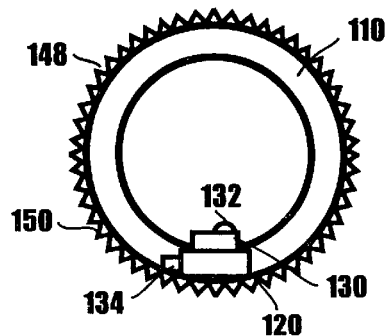
FIG. 19 is a side view of the ring.
Figure 20:
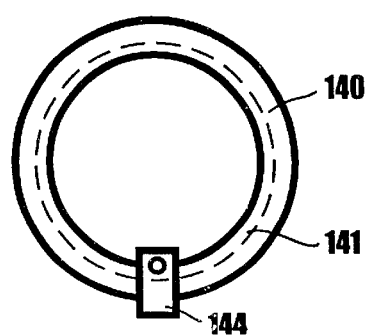
FIG. 20 is a side view of the annular ring mount.
Figure 21:
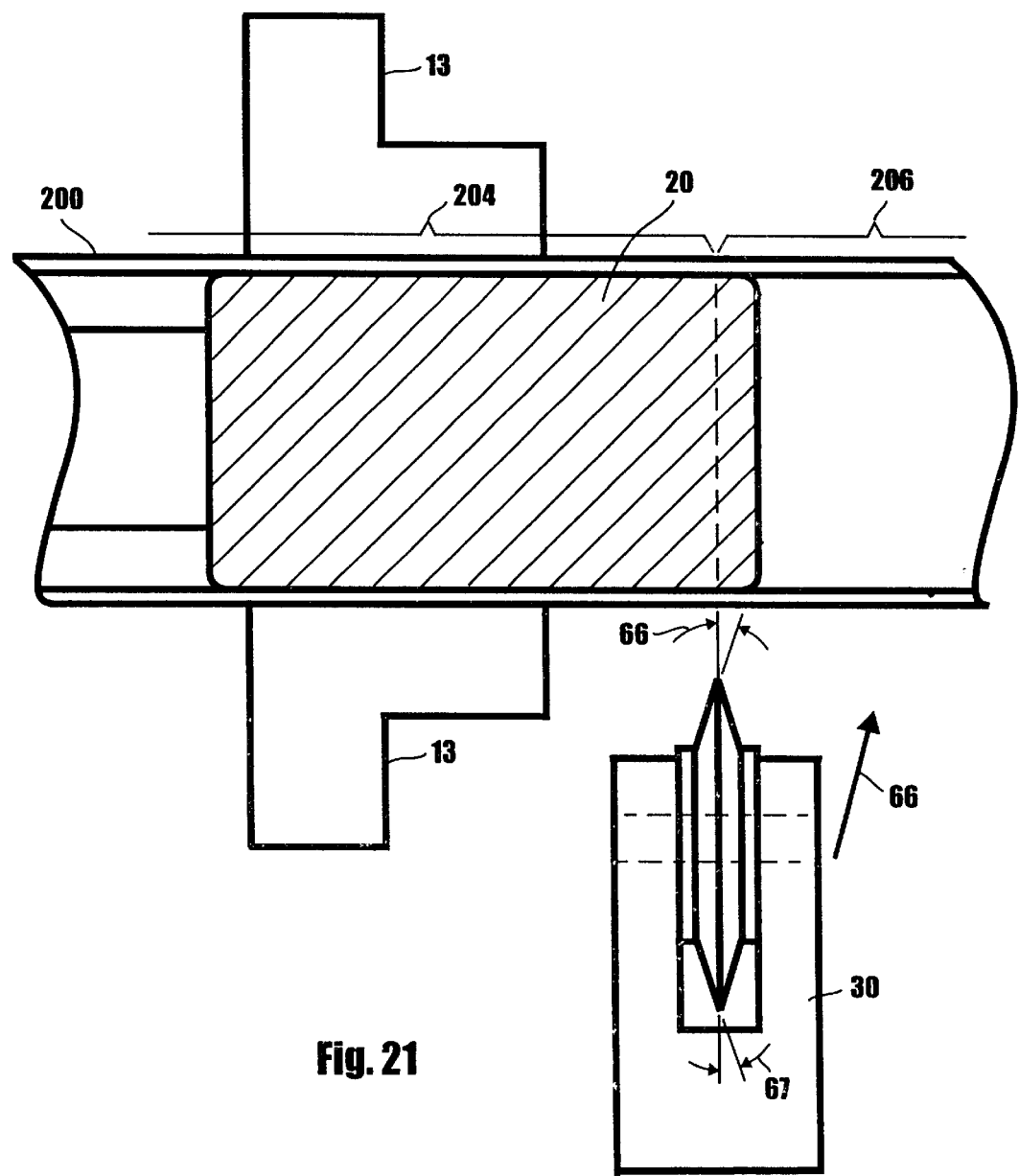
FIG. 21 is a side view of the tube cutter of FIG. 1.

The tube cutter of the present invention in its primary embodiment comprises a lathe 10 including a base 12 supporting a rotating three-member chuck 13 with a rotational axis configured to secure a cylindrical tube 200 axially between chuck rotational axis configured to secure a cylindrical tube 200 axially between chuck members 13, a mandrel 20 positioned axially within the chuck and extending forward from the chuck members to a tool holder 30 on a tool holder mount 50, a tube separator 70 on the base 12 forward of the tool holder 30, and a processor 85. A tube support 90 is included rearward of the chuck 13 positioned to receive and support a tube extending rearward out of the chuck. In operation, a tube 200 is positioned in the chuck 13 over the mandrel 20 with a desired cut point 202 before the tool holder mount 30 with the tube rearward portion, or tube body 204, supported by the tube support 90 and the tube forward portion, or cut portion, 206 supported by the tube separator 70.

The mandrel 20 is cylindrical with its cylindrical wall 21 comprising a plurality of segments 22 arrayed longitudinally around cylinder circumference 23. Each segment 22 is U-shaped comprising parallel first and second legs 24 and 25 with leg first ends 26 attached to a bridge 27 at a mandrel first end 28. First leg second ends 29 are attached to a mandrel ring 30 at a mandrel second end 31 with the second leg second ends 32 remaining unattached. The legs and bridge further comprise a cylindrical outer surface 33 for contacting tube wall 34. They further comprise an inner surface 35 opposite the outer surface 33 but tapered from the mandrel first end 28 to a mandrel second end 31. The mandrel further comprises a ram 37 moving longitudinally within the segments having a frustum outer surface 38 matching the segment tapered inner surfaces 35. Hydraulic pressure conveyed through hydraulic line 39 causes the ram to move between its rest position 40 and its expansion position 41. In its rest position, the ram is moved longitudinally outward from the mandrel segments 22 sufficient to remove radial expansion force from the segments. In its expansion position, the ram is moved longitudinally inward toward the mandrel segments 22, its tapered frustum outer surface 38 moving against the matching segment inner surfaces 35 to move the segments radially outward. As the segment segments move outward the legs 24 and 25 each separate both from their counterpart legs, which together comprise the U-shape, but also from legs of adjacent segments, also in parallel. To preclude tube distortion during cutting, it is important that the mandrel support the tube largely around the tube wall from inside. Therefore, it is important to minimize separation between the respective segment legs as the mandrel expands into the tube. This is achieved in the plurality of segments being of sufficient number such that the separation between any two adjacent legs is small. As implemented, the number of segments for a two-inch mandrel is six, and the resulting separation between segment legs is approximately a millimeter. To assure minimal expansion is necessary and that therefore necessary segment expansion is minimal, mandrels are sized to match tube inner diameters.

The tool holder mount 50 comprises a tool holder platform 51 secured to the lathe base 12 with a horizontal platform threaded hole (not shown). A tool holder plate 53 slidably rests on the tool holder platform 51. Attached to the tool holder plate 53 is a controller mount 54 with a controller hole 55 therethrough. A controller threaded rod 56 rotationally attached to the controller mount 54 passes through the controller hole 55 and into the platform threaded hole such that threading of the threaded rod 56 into and out of the platform threaded hole causes the controller mount 54 and tool holder plate 53 to move horizontally on the tool holder platform 51. Typically, a controller motor 52 is attached to the threaded rod 56 causing the threaded rod 56 to rotate in the controller mount 54. A threaded rod handle 57 also may be provided for manual rotation of the threaded rod 56.

The tool holder mount 50 further comprises tool holder 30 mounted on the tool holder plate 53 and raised to a position radial from the chuck axis, typically horizontal with the mandrel approximately. A blade 59 mounts rotationally in the tool holder 30 on a blade axle 60 such that the blade rotates when in contact with the tube as the tube rotates in the chuck so the blade pushes itself into soft metal of the tube rather than peeling metal off the tube, dividing the tube into a tube body 204 and a tube cut portion 206, or end. The blade 59 comprises a body side 63 and an end side 64 joining at a blade edge 65, each at angles from normal to the tube wall, referred to as body side angle 66 and end side angle 67. The tool holder 30 and the tool holder platform 51 advance on the threaded rod 56 at the body side angle 66 50 that tube metal does not gather on the tube body side 204. That is, the blade 59 moves toward intersection with the tube wall 34 of tube 200 at an angle equal to or greater than body side angle 66. Or equivalently referring instead to its complementary angle, the blade 59 moves toward intersection with the tube wall 34 on a line that forms an angle with the tube wall 34, or equivalently its longitudinal axis, that is equal to or less than that angle formed between the blade body side and the tube wall 34 such that only the blade end side 64 contacts the tube 200 during cutting. The blade end side 64 therefore is angled into the tube cut portion 206 urging the tube away from the blade 59, effecting a necking 205 of the tube material before the blade edge 65 remaining between the tube body 61 and the tube cut portion 62. Though the tube is mounted to allow the tube end move freely, to the extent the blade encounters resistance to movement of the tube cut portion 206, tube material may continue to gather on the cut edge of the tube cut portion 206.

Supporting the tube cut portion 206, the tube separator 70 comprises a stand 71 mounted to the lathe base 12, forward of the mandrel and includes a U-shaped channel 72 between flanges 73 and 74 in which a tube may rest. Draped across the channel is a sling 75 between the channel flanges 73 and 74 for supporting the tube. The sling 75 is mounted in the stand 71 in a loop traveling around the channel 72 by action of the tube 200 as the tube turns in the chuck 13. One of the flanges 73 includes a hinged keeper 76 leaning into the channel 72 and over the tube therein under resilient bias of a keeper spring 77 allowing the tube 200 to pass by and into the channel onto the sling, by urging the keeper 76 against the spring bias while keeping the tube in the channel until lifted out past the keeper. The sling 75 also absorbs slight longitudinal movement in the tube cut portion 206 as the blade 59 urges the tube cut portion 206 slightly away from the tube body 204.

A bar 78 along the stand 71 under upward bias of a bar spring 79 has an end 80 extending upward above the sling 75 such that a tube 200 in the sling urges the bar down against the bar spring bias. A load sensor 81 is under the bar indicating when the bar is under the weight of the tube. As the tube wall weakens the spring bias moves the tube cut portion and unweights the load sensor 81, indicating near tube wall failure.

Processor 85 in electrical communication with controller motor 55 directs the motor to turn the threaded rod 56 to drive the tool holder platform toward the tube at a determined rate. The processor 85 is also in electrical communication with the bar load sensor 81. When the processor 85 receives a signal from the bar load sensor 81 that the load sensor 81 is less weighted indicating movement of the tube as a result of a weakening of the tube wall, or more specifically, the necking 205 in the tube wall before the blade edge 65, the processor 85 directs the motor 55 to reverse direction of rotation of the threaded rod 56 causing the blade to withdraw from the tube 200 even before the necking 205 fails. The bar 78 continues to move the tube cut portion 206 off axis causing the tube 200 to snap the tube cut portion 206 from the tube body 204 at the necking 205 before the blade edge encounters the mandrel 20. In actuality, the bar 78 moves in a continuous motion from the time the necking 205 begins to fail until the tube cut portion 206 snaps off, and it occurs rapidly, making the time of reversal of the tool blade 59 virtually indistinguishable from the time the bar 78 snaps off the tube cut portion, appearing to occur simultaneously. However, for a very thin tube wall the inner groove opposite the necking 205 from the blade 59 may be small. If the blade 59 advanced even only a short time, the blade could impact and damage the mandrel 20. Thus, even initial movement of the tube cut portion conveys a signal to the process to reverse tool holder direction before the necking fails and therefore before the blade can further advance past the necking into the mandrel.

As described, the first embodiment comprises a nonrotating tool holder acting on a rotating tube in a rotating chuck. Since it is equivalent to the tube-severing concept whether the tube rotates or the tool holder rotates, a second embodiment comprises those elements that implement the tool holder rotating around a nonrotating tube secured in a stationary chuck. Further, this second embodiment obviates the massive lathe base of the primary embodiment and the tube cutter becomes portable, able to move to an installed tube or applicable to a tube with bends, which would not be conducive to rotation in a lathe chuck.

Thus, the tube cutter in this second embodiment comprises a mandrel 20 over which the tube 200 is placed, a tube separator 70, and a processor, all as in the primary embodiment. The tube cutter also comprises a rotating ring 110 with a tool holder mount 120 thereon. A tool holder 130 with a blade 132 mounted therein as in the primary embodiment advances from the ring 110 toward the tube 200 under control of processor 85 directing action of tool mount motor 134. The ring 110 rotates on annular ring mount 140, within a groove 141, that secures to the tube by means of a stationary chuck 142 with an axis configured to secure a cylindrical tube 200 axially between cooperating chuck members 143. Ring drive motor 144 mounted on the ring mount 140 drives the ring rotationally within the ring mount as motor teeth 146 engage ring teeth 148 on the ring circumference 150. Electrical contacts (not shown) within the groove 141 and connected to processor 85 contact ring electrical contacts (not shown) around the ring electrically communicating with tool mount motor 134 controlling movement of the tool holder mount 120 toward and away from the tube 200. As in the primary embodiment, the tool holder mount 120 advances toward and into the tube at the angle the tool blade 132 makes with the tube on its tube body side 63. A tube separator 70 also as in the primary again serves to separate the tube cut portion from the tube body and prevent the blade from impacting the mandrel within the tube.

A mandrel shaft is also obviated when the mandrel on which it otherwise would be attached is installed in the tube from the tube end being cut, provided the cut is near the tube end. Otherwise, the mandrel shaft must be flexible to move through an installed or a bent tube. The tube support of the primary embodiment envisions a straight tube extending over a rigid shaft extending rearward from the chuck. In this second embodiment, the tube is installed or independently secured in a nonrotating position. A rigid mandrel shaft is not required to support the tube. Rather, the shaft is typically rolled onto a spool and unrolled for use into a tube. A tube displacement measurement device monitors how far the shaft and mandrel thereon have moved into the tube, advancing until the mandrel is in position opposite the tool holder and blade.

One skilled in the art will recognize the advantages taught by this invention and illustrated by the preferred embodiments presented. The specification and drawings are not intended to represent an exhaustive description of the invention. Obvious applications, equivalent embodiments, and extensions of the invention are intended to be within the spirit and scope of this invention.

What is claimed is:

1. A machine for severing a tube with an inner and an outer wall, comprising,
    a chuck with a center axis adapted to axially receive and grasp the tube outer wall,
    a cylindrical mandrel with first and second ends and with an axis concentric with the chuck axis, the mandrel being radially expandable opposite the chuck securing the mandrel firmly to the tube inner wall, the chuck and mandrel rotating with the tube,
    a tool holder,
    a blade in the tool holder, the blade comprising an end side and a body side intersecting at a blade edge, the body side being at a body side angle measured from normal to the tube, said tool holder adapted to move on a line intersecting the tube outer wall at an angle equal to or greater than the body side angle such that only the blade end side contacts the tube during cutting.

2. The machine of claim 1 further comprising a mandrel shaft on the mandrel second end adapted to position the mandrel longitudinally in the tube such that the mandrel is positioned opposite the chuck.

3. The machine of claim 1 further comprising a plurality of selective mandrels wherein one of said plurality of mandrels matching a tube inner diameter is incorporated into said cutting machine.

4. The machine of claim 1 wherein the mandrel shaft extends rearward of the chuck, supported rotationally on a shaft support, the tube when mounted in the chuck extending rearward of the chuck on the mandrel shaft.

5. The machine of claim 1 wherein said shaft is flexible enabling the shaft and mandrel attached to move through a tube with bends to a position opposite the chuck and tool holder.

6. A machine for severing a tube with an inner and an outer wall, comprising,
    a chuck with a center axis adapted to axially receive and grasp the tube outer wall,
    a cylindrical mandrel with first and second ends and with an axis concentric with the chuck axis, the mandrel being radially expandable opposite the chuck securing the mandrel firmly to the tube inner wall, the chuck and mandrel rotating with tube,
    a tool holder,
    a blade in the tool holder, the blade comprising an end side and a body side intersecting at a blade edge, the body side being at a body side angle measured from normal to the tube, said tool holder adapted to move on a line intersecting the tube outer wall at an angle equal to or greater than the body side angle such that only the blade end side contacts the tube during cutting,
    wherein the mandrel comprises
    a plurality of segments arrayed longitudinally around a cylinder circumference, each segment comprising parallel first and second legs with leg first ends attached to a bridge at a mandrel first end forming a "U" shape, wherein first leg second ends are attached to a mandrel ring at a mandrel second end with the second leg second ends remaining unattached, the legs and bridge comprising a cylindrical outer surface for contacting a tube inner wall and an inner surface opposite the outer surface tapered from the mandrel first end to a mandrel second end
    a ram moving longitudinally within the segments having a frustum outer surface matching the segment tapered inner surfaces
    a hydraulic valve, subject to control by a machine user and receiving pressurized fluid from a hydraulic pump, in fluid communication with the ram causing the ram to move between a ram rest position and a ram expansion position, the ram moving to said rest position longitudinally outward from the mandrel segments sufficient to remove radial expansion force from the segments and the ram moving to said expansion position longitudinally inward toward the mandrel segments, its tapered frustum outer surface moving against the matching segment inner surfaces to move the segments radially outward separating legs both from their counterpart legs which together comprise the U-shape and from legs of adjacent segments.

7. The machine of claim 6 wherein the plurality of segments are of sufficient number such that separation between any two adjacent legs is small such that the mandrel substantially supports the tube around the tube wall minimizing separation between the respective segment legs as the mandrel into the tube.

8. The machine of claim 7 wherein the number of segments for a mandrel approximately two-inches in diameter is six and the resulting separation between segment legs is approximately a millimeter.

9. A machine for severing a tube with an inner and an outer wall, comprising,
   a chuck with a center axis adapted to axially receive and grasp the tube outer wall,
   a cylindrical mandrel with first and second ends and with an axis concentric with the chuck axis, the mandrel being radially expandable opposite the chuck securing the mandrel firmly to the tube inner wall, the chuck and mandrel rotating with tube,
   a tool holder,
   a blade in the tool holder, the blade comprising an end side and a body side intersecting at a blade edge, the body side being at a body side angle measured from normal to the tube, said tool holder adapted to move on a line intersecting the tube outer wall at an angle equal to or greater than the body side angle such that only the blade end side contacts the tube during cutting,
   a pressure-sensitive instrument in communication with the tool holder and positioned to intersect the tube axially forward of the mandrel, the tube, when installed over the mandrel concentric with the mandrel axis in preparation for cutting, moving the pressure-sensitive instrument against an instrument bias, indicating a tube installed on the mandrel to the tool holder, the tube bias moving the tube off axis when the tool blade weakens the tube wall to near failure, causing the tube cut portion to snap off the tube body.

10. The machine of claim 9 wherein movement of the pressure-sensitive instrument causes the tool blade withdraw from the tube.

11. The machine of claim 10 further comprising a motor mechanically linked to the tool holder, the motor moving the tool holder relative to the mandrel,
   a processor controlling action of the motor and in communication with the pressure-sensitive instrument wherein movement of the pressure-sensitive instrument with the instrument bias indicating imminent tube wall severance is communicated to the processor which controls the tool holder to reverse directions away from the mandrel upon detecting movement of the pressure-sensitive instrument toward the mandrel axis.

12. The machine of claim 9 further comprising
   a stand forward of the mandrel including opposing, spaced-apart flanges at the stand top forming a U-shaped channel in which a tube may rest
   a sling draped across the channel between the channel flanges adapted to support the tube and traveling around the channel in a loop by action of rotation of the tube resting on the tube.

13. The machine of claim 12 further comprising a keeper hinged on one of the flanges and leaning into the channel and over the tube therein under resilient bias of a keeper spring allowing the tube to pass by and into the channel onto the sling by urging the keeper against the spring bias while keeping the tube in the channel until lifted out past the keeper.

14. The machine of claim 13 further comprising a shaft movement measurement device adapted to record displacement of the mandrel in the tube as the mandrel advances within the tube.

15. The machine of claim 12 wherein the pressure-sensitive instrument comprises
   a bar along the stand under upward bias of a bar spring with an end extending upward above the sling such that the tube in the sling urges the bar down against the bar spring bias, and
   a load sensor under the bar indicating when the bar is under weight of the tube, such that as the tube wall weakens the spring bias moves the tube cut portion and unweights the load sensor, indicating near tube wall failure.

16. The machine of claim 15 further comprising
   a motor mechanically linked to the tool holder, the motor moving the tool holder relative to the mandrel,
   a processor controlling action of the motor and in communication with the load sensor.

17. The machine of claim 16 wherein movement of the bar with the spring bias causes the load sensor to communicate signal to the processor indicating a change in load which processor then causes the tool blade to withdraw from the tube.

18. A machine for severing a tube with an inner and an outer wall, comprising,
   a cylindrical mandrel with first and second ends and with an axis, the mandrel being radially expandable opposite the chuck, securing the mandrel firmly to the tube inner wall,
   a tool holder adapted to move around a mandrel circumference and radially toward and away from the mandrel,
   a blade in the tool holder, the blade comprising an end side and a body side intersecting a blade edge, the body side being at a body side angle measured from normal to the tube, said tool holder adapted to move on a line intersecting the tube outer wall at an angle equal to or greater than the body side angle such that only the blade end side contacts the tube during cutting.

19. The machine of claim 18 further comprising
   an annular ring mount around the mandrel circumference,
   a rotating ring constrained to move on the annular ring mount with said tool holder movable radially on the ring.

20. The machine of claim 19 further comprising a motor engaging the ring causing the ring to move around the annular ring mount.

21. The machine of claim 18 further comprising a chuck on said annular ring mount with cooperating radially-adjustable chuck members adapted to grasp a tube within on a chuck center axis, concentric with the mandrel axis.

22. The machine of claim 18 further comprising a pressure-sensitive instrument in communication with the tool holder and positioned to intersect the tube axially forward of the mandrel, the tube, when installed over the mandrel concentric with the mandrel axis in preparation for cutting, moving the pressure-sensitive instrument against an instrument bias, indicating to the tool holder that a tube is installed on the mandrel, the tube bias moving the tube off axis when the tool blade weakens the tube wall to near failure, causing the tube cut portion to snap off the tube body.

* * * * *